United States Patent
Tanabe

(10) Patent No.: US 6,169,996 B1
(45) Date of Patent: Jan. 2, 2001

(54) REMOTE OBSERVATION SYSTEM HAVING TRANSMISSION LINE FOR ISOLATING LOCAL AREA NETWORK AT DATA GATHERING SITE FROM REMOTE MONITORING SITE, AND HAVING PROVISION FOR DATA REQUEST FROM REMOTE MONITORING SITE VIA THE TRANSMISSION LINE

(75) Inventor: Jiro Tanabe, Tokyo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 08/822,750

(22) Filed: Mar. 24, 1997

(30) Foreign Application Priority Data

Jul. 24, 1996 (JP) .................................................. 8-195090

(51) Int. Cl.[7] ..................................................... G06F 15/16
(52) U.S. Cl. .......................................... 707/501; 707/513
(58) Field of Search ..................................... 707/501, 513, 707/10, 104; 345/329, 335, 339; 395/200.47

(56) References Cited

U.S. PATENT DOCUMENTS

| | | | |
|---|---|---|---|
| 5,400,246 | * | 3/1995 | Wilson et al. ........................ 364/146 |
| 5,737,560 | * | 4/1998 | Yohanan ............................... 345/329 |
| 5,748,188 | * | 5/1998 | Hu et al. ............................... 345/326 |
| 5,752,023 | * | 5/1998 | Choucri et al. ......................... 707/10 |
| 5,799,292 | * | 8/1998 | Hekmatpour ........................... 345/333 |

OTHER PUBLICATIONS

Oliver, Netscape 2 Unleashed, Sam.net Publishing, Feb. 1996, pp. 270–273 and 282–284.

* cited by examiner

Primary Examiner—Stephen S. Hong
(74) Attorney, Agent, or Firm—Sughrue, Mion, Zinn, Macpeak & Seas, PLLC

(57) ABSTRACT

An remote observation system including a hypertext data transmitter for transmitting hypertext data from an observation object side to an office side through a data transmission line connecting therebetween, and a hypertext display unit for displaying at the office side the hypertext data sent from the observation object side. The hypertext data consist of a combination of fixed image data representing a plant in its entirety and status data of various portions of the plant, which are collected by a data collection device. This makes it possible to solve a problem of a conventional remote observation system in that only insufficient information is acquired at the office side because the office side is not directly connected with the observation object side, and hence the office side can acquire the information on the states of the observation object side only when the observation object side sends reports to the office side.

5 Claims, 6 Drawing Sheets

REMOTE OBSERVATION SYSTEM HAVING TRANSMISSION LINE FOR ISOLATING LOCAL AREA NETWORK AT DATA GATHERING SITE FROM REMOTE MONITORING SITE, AND HAVING PROVISION FOR DATA REQUEST FROM REMOTE MONITORING SITE VIA THE TRANSMISSION LINE

BACKGROUND OF THE INVENTION

1. Field of the Invention

The present invention relates to a remote observation system for observing the state of a plant from a distant place.

2. Description of Related Art

FIG. 6 shows a configuration of a conventional remote observation system. In this figure, the reference numeral 101 designates a computer such as a PC (personal computer) or a workstation placed in an office faraway from the observation object. The computer 101 includes a hypertext display unit 102 for displaying a hypertext.

The reference numeral 103 designates a network such as LAN (Local Area Network) for connecting the computer 101 with other computers; 104 designates a plurality of computers like engineering workstations for communicating with the computer 101 through the network 103; and 105 designates a CRT for displaying data transmitted from the hypertext display unit 102. These devices 101–105 are placed at the office side.

The reference numeral 106 designates a controller for carrying out control and data acquisition at the observation object side; 107 designates an observation control network for connecting the controller 106 with other controllers; and 108 designates an observation control computer for carrying out data collection through the observation control network 107. The observation control computer 108 has a data collection means 109.

The reference numeral 110 designates a man-machine computer for controlling a man-machine system for observation control. The man-machine computer 110 includes fixed image data 111 drawn by a builder or the like, and a man-machine display means 113 for generating observation image data from the fixed image data 111 and the data collected by the data collection means 109 to display the observation image data on the CRT 112. The devices 106–113 are placed at the observation object side like a plant.

The operation will be described.

The computer 101 at the office side processes data fed from the plurality of computers 104 through the network 103, and displays them on the CRT 105, thereby carrying out the office work.

At the observation object side, on the other hand, the data collection means 109 in the observation control computer 108 collects the data acquired by the controllers 106 through the observation control network 107. The man-machine display means 113 in the man-machine computer 110 generates the observation image data on the basis of the fixed image data 111 and the data collected by the data collection means 109, and displays them on the CRT 112, thereby performing the plant observation job.

Thus, the plant observation job and the office work are carried out independently in the conventional remote observation system with the foregoing configuration, because the observation control network which connects the computers for observing the plant is not directly connected to a LAN which interconnects the offices.

Therefore, in case of emergency, for example, the office side can obtain only insufficient information on the state of the observation object side because a report from the observation object side is the only information on the state. Besides, to monitor the observation object side at the office side, a dedicated system must be constructed between the office side and the observation object side. This, however, has problems in that such a system becomes expensive and cannot be applied to some other purpose.

SUMMARY OF THE INVENTION

The present invention is accomplished to solve the foregoing problems, and has an object to provide an inexpensive remote observation system which can be applied to some other purpose by utilizing LAN and office automation equipment commonly used.

Another object of the present invention is to provide a remote observation system which can offer more detailed information on the state of the plant in case of emergency by carrying out plant observation job from the faraway office by using the LAN.

According to one aspect of the present invention, there is provided a remote observation system comprising:

a data transmission line for connecting an observation object side and an office side at a distant place;

data collection means for collecting observation data by observing a plant at the observation object side;

hypertext data transmission means for transmitting hypertext data to the office side through the data transmission line in response to a request for data transmission from the office side, the hypertext consisting of a combination of fixed image data representing the plant: in its entirety and state data of various portions of the plant which are obtained from the data collection means; and hypertext display means for displaying the hypertext data transmitted to the office side.

Here, the remote observation system may further comprise:

at the observation object side, variable data transfer means for transferring variable image data obtained from the data collection means to the hypertext data transmission means; and fixed image transfer means for transferring the fixed image data to the hypertext data transmission means; and at the office side, variable image display means for displaying the variable image data transmitted from the hypertext data transmission means;

fixed image display means for displaying the fixed image data transmitted from the hypertext data transmission means; and periodic update means for periodically requiring the observation object side to transmit data.

The remote observation system may further comprise:

at the observation object side, image acquisition means for storing a program with a function of displaying a fixed image, a program with a function of displaying a variable image, and a program with a function of periodically transferring data to the office side, and at the office side, program storing means for storing the programs transmitted from the observation object side, and for displaying data transmitted from the observation object side in accordance with the programs.

The hypertext transmission means may transmit the fixed image data first, and the state data every time the state data change, and the hypertext display means may display the state data in combination with the fixed image data.

DETAILED DESCRIPTION OF THE PREFERRED EMBODIMENTS

The invention will now be described with reference to the accompanying drawings.

EMBODIMENT 1

Figure 1:
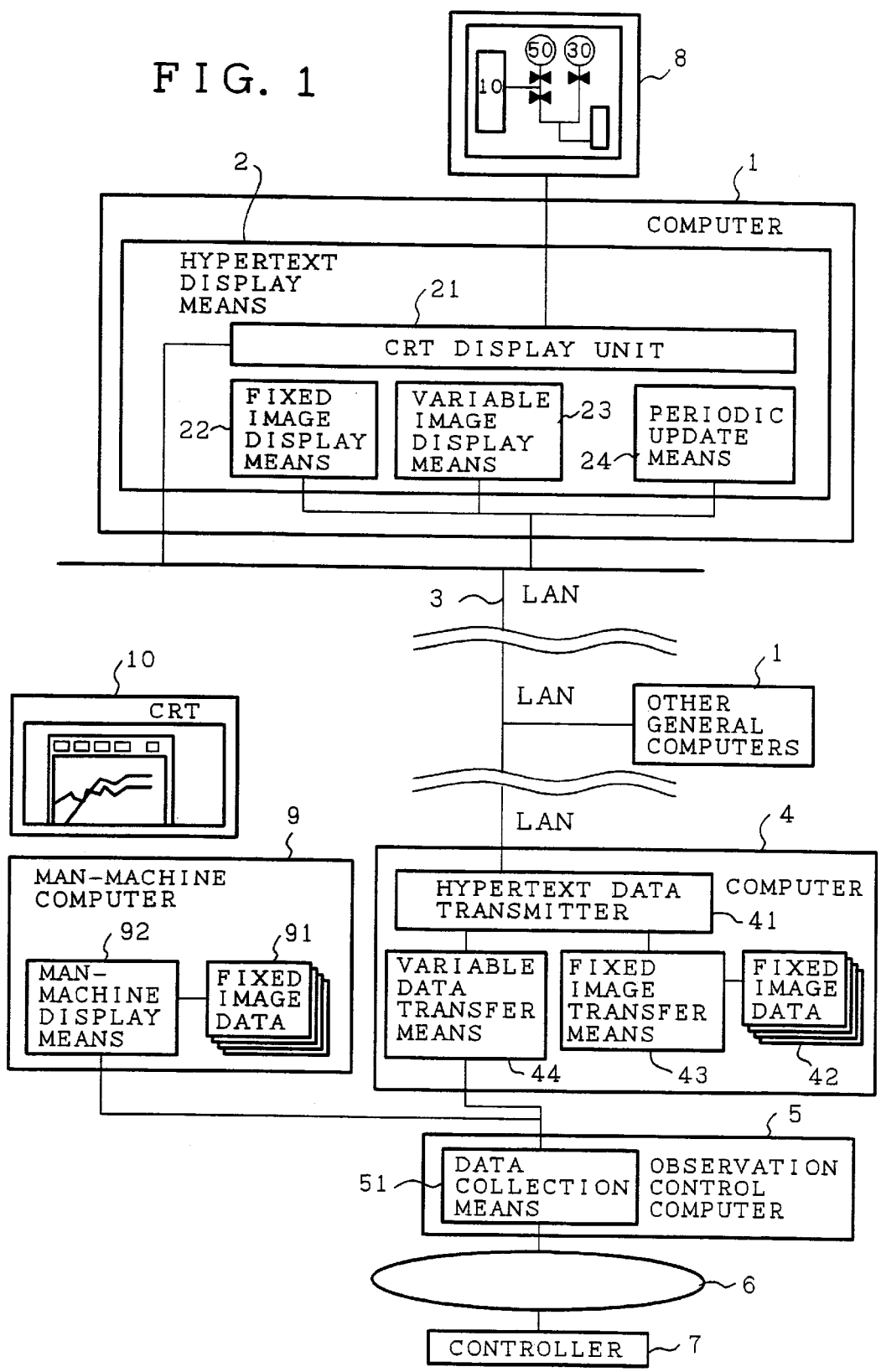
FIG. 1 is a block diagram showing an embodiment 1 of a remote observation system in accordance with the present invention.

In FIG. 1, the reference numeral 1 designates a computer such as a PC (personal computer) or a workstation placed in an office faraway from an observation object side. The computer 1 includes a hypertext display means 2 for displaying a hypertext. The hypertext display means 2 includes a CRT display unit 21 for drawing an image on a CRT 8, a fixed image display unit 22 for drawing fixed portions in an observation image, a variable image display unit 23 for drawing variable portions of the observation image, and a periodic update means 24 for periodically calling update job of the observation image.

The reference numeral 3 designates a network such as a LAN for interconnecting computers in various places, and 4 designates a computer, placed at an observation object side which observes a plant, for transmitting hypertext data. The computer 4 includes a hypertext data transmitter 41 for transmitting the hypertext data, fixed image data 42 of the observation image formed by a builder or the like, a fixed image transfer unit 43 for carrying out acquisition and transfer of the fixed image when requested, and a variable data transfer unit 44 for transmitting variable data on demand.

The reference numeral 5 designates an observation control computer for performing data collection. The observation control computer 5 includes a data collection means 51 for collecting data from a controller 7 through an observation control network 7. The controller 7 carries out the control of an observation object (not shown) and data acquisition. The reference numeral 9 designates a man-machine computer for controlling an observation control man-machine system. The man-machine computer 9 includes fixed image data 91, and a man-machine display means 92 for drawing, on a CRT 10, interfaces for carrying out the observation control of the observation object, thereby enabling an operator to perform observation while watching images displayed on the CRT 10 at the observation object side.

It is possible to employ, as the hypertext data transmitter 41 and the hypertext display means 2, an HTTP (HyperText Transfer Control) server (a server for transmitting hypertexts) used in the WWW (World Wide Web), and Netscape or Mosaic used in the WWW browsers (software for displaying hypertexts). Thus, they can display information on client management, drawings, or the like. A personal computer or a workstation can be used as the computer 1 at the observation object side.

The operation will now be described.

Figure 2:
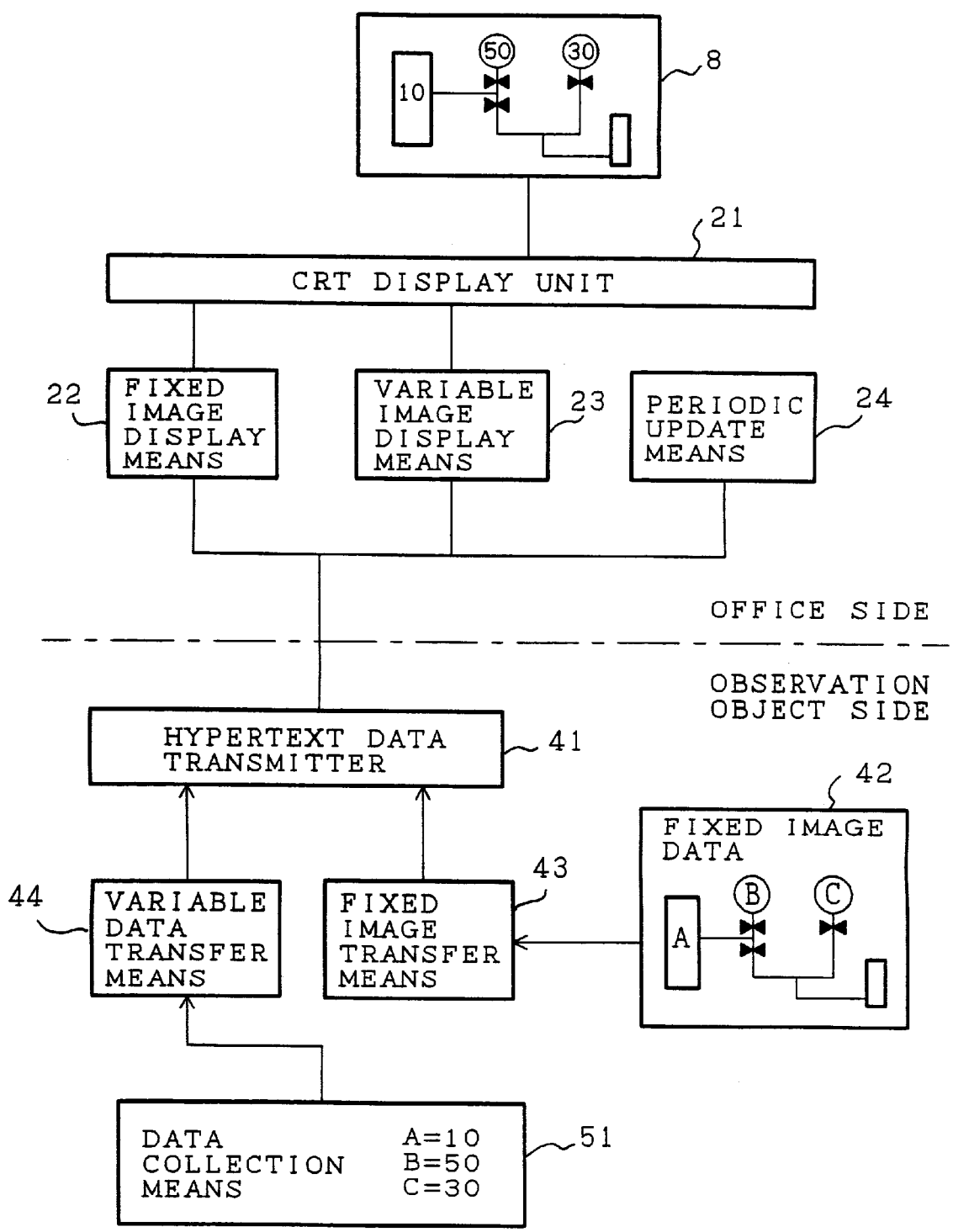
FIG. 2 is a block diagram showing a major portion of the embodiment 1 of the remote observation system in accordance with the present invention.
Figure 3:
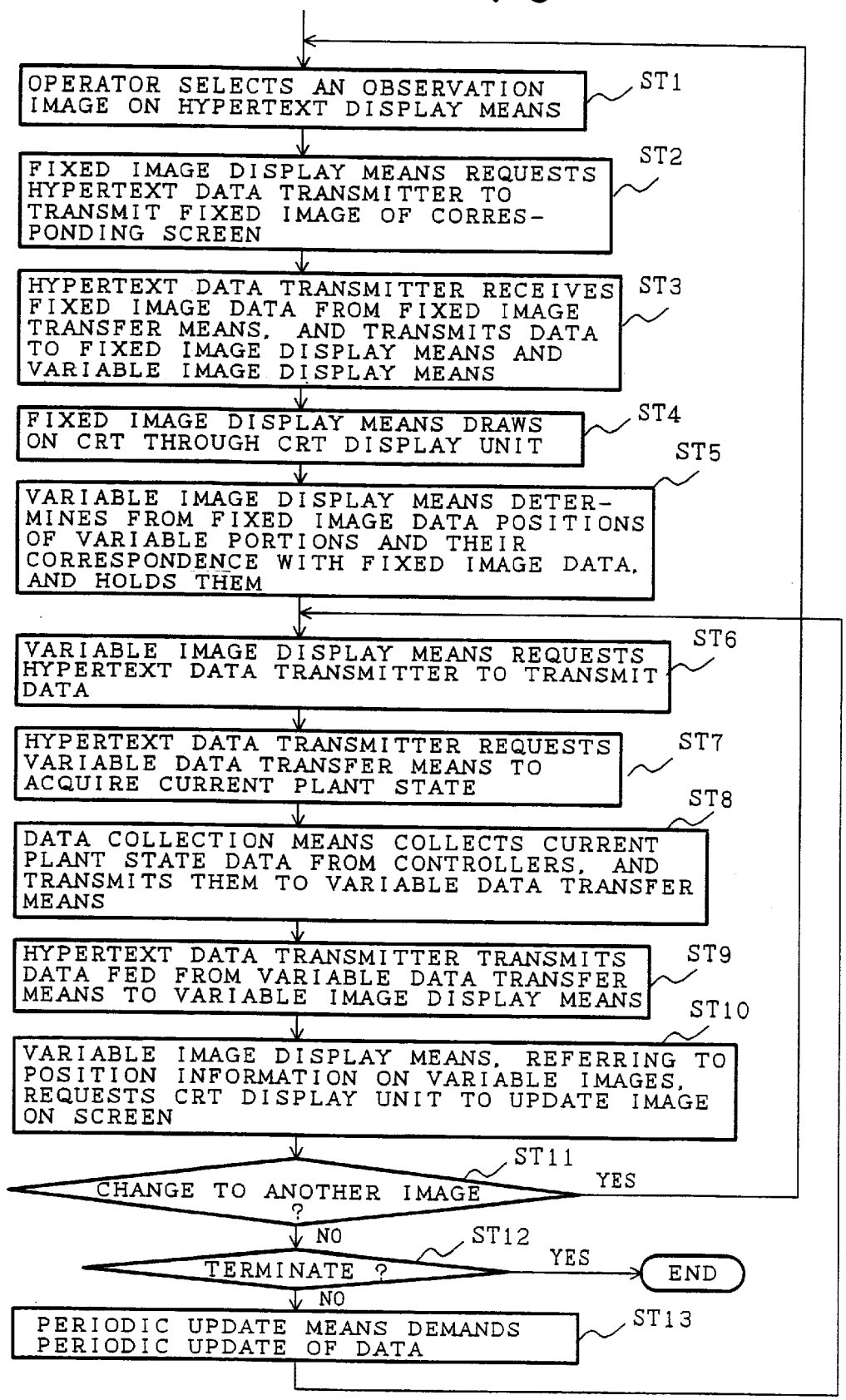
FIG. 3 is a flowchart illustrating the operation of the embodiment 1.

FIG. 2 is a detailed block diagram illustrating the major portion for performing a drawing operation at the office side, which is carried out in accordance with the data at the observation object side, and FIG. 3 is a flowchart for explaining the drawing operation. When an operator selects an observation image through the hypertext display means 2 at step ST1 at the beginning of the operation, the fixed image display means 22 requests the hypertext data transmitter 41 to transmit fixed image portions in the corresponding screen at step ST2.

The hypertext data transmitter 41, receiving the fixed image data from the fixed image transfer means 43, transmits the data to the fixed image display means 22 and variable image display means 23 at step ST3. The fixed image display means 22 draws on the CRT 8 through the CRT display unit 21 at step ST4, and the variable image display means 23 determines from the fixed image data the positions of variable portions and their correspondence with the fixed image data, and holds them at step ST5.

The variable image display means 23 requests the hypertext data transmitter 41 to transmit data at step ST6. The hypertext data transmitter 41 requests the variable data transfer means 44 to acquire the current plant state at step ST7. The data collection means 51 collects the current plant data from the controllers 7, and transmits them to the variable data transfer means 44 at step ST8. The hypertext data transmitter 41, receiving the data from the variable data transfer means 44, transmits the data to the variable image display means 23 at step ST9.

The variable image display means 23, referring to the position information on the variable images, requests the CRT display unit 21 to update the images at step ST10. Subsequently, the variable image display means 23 decides whether to change the images to other images or not at step ST11, and repeats the foregoing steps from the step ST1 if the decision is positive, whereas it further decides whether to terminate the operation at step ST12 if it is negative. If the decision result at step ST12 is positive, it terminates the operation, whereas if it is negative, the periodic update means 24 demands the periodic update of the data at step ST13, followed by returning to step ST6 to carry out the operation therefrom.

According to the present embodiment 1 the following advantages can achieved.

(1) A highly reliable remote observation system is implemented by utilizing the common office automation equipment at the office side, and the conventional network and computers for the observation control at the observation object side. This also makes it possible to construct a rather inexpensive remote observation system, in which software for other purposes such as word processing programs or spread sheet programs can also be used while carrying out the observation.

(2) Since the periodic update means is provided for periodically requesting the observation object side to transmit data, the new plant state can be displayed periodically.

(3) Since the fixed image data is transmitted first, and the state data is transmitted every time the state data change, and the state data is displayed, at the office side, in combination with the fixed image data which has already been sent, the amount of the transmitted data can be reduced, thereby increasing the processing speed.

(4) The data to be used by the remote observation system is transferred through a common LAN after converting them into data with a standard structure by a data transform means, without directly connecting the LAN and the observation control network. Thus, the data are exchanged between the observation object side and the office side by adding only the data transform function. This offers an advantage that the problems with the security and the load of the networks do not occur.

EMBODIMENT 2

Figure 4:
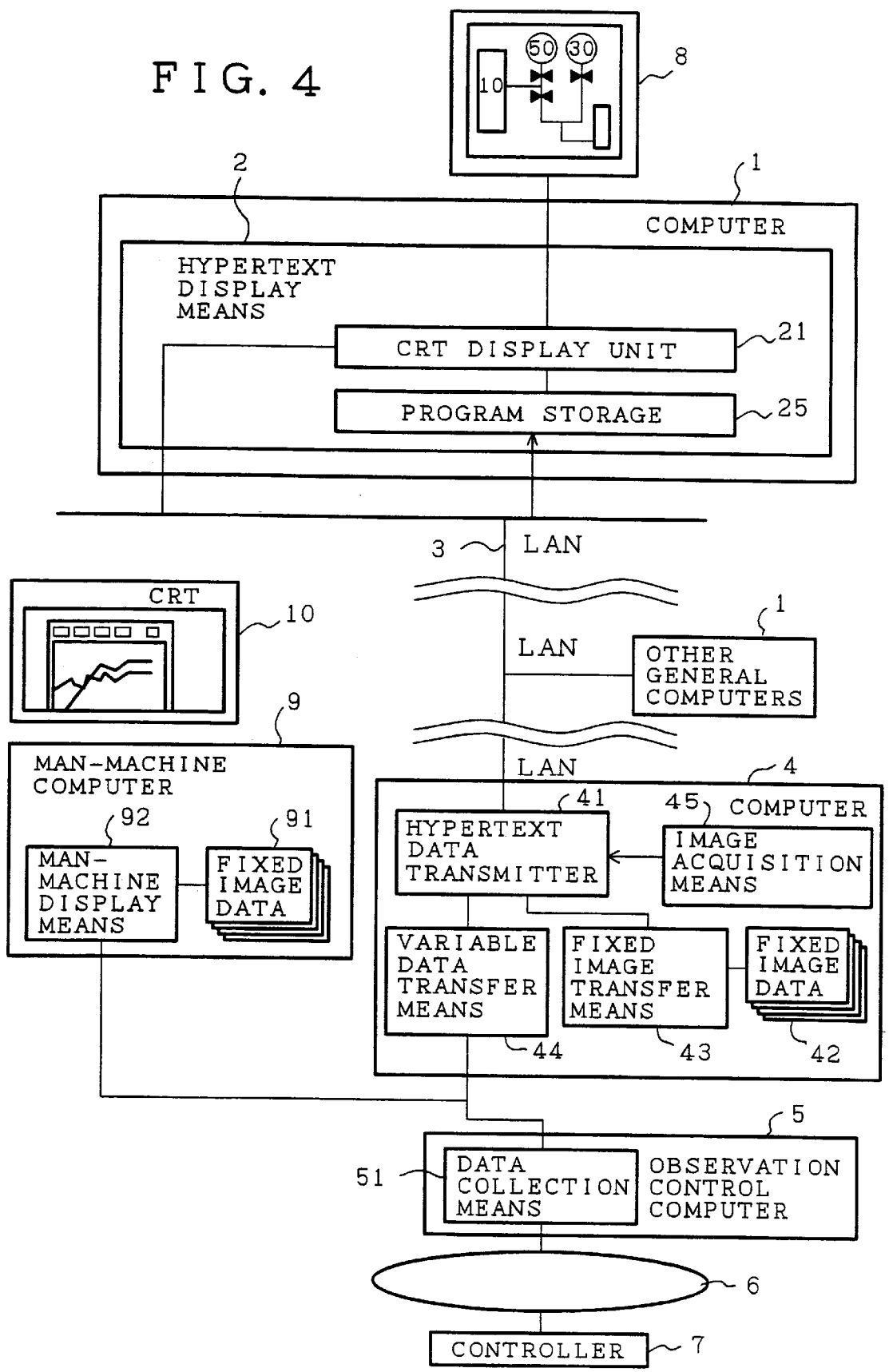
FIG. 4 is a block diagram showing an embodiment 2 of the remote observation system in accordance with the present invention.

FIG. 4 is a block diagram showing an embodiment 2 of the remote observation system in accordance with the present invention, in which the same portions as those of FIG. 1 are designated by the same reference numerals, and the duplicate explanation thereof are omitted here. In this figure, the reference numeral 45 designates image acquisition means including a program with a function of the fixed image display means, a program with a function of the variable image display means and a program with a function of the periodic update means. The reference numeral 25 designates a program storage which is provided at the office side for storing the programs sent from the observation object side to carry out the data display.

The operation will now be described.

Figure 5:
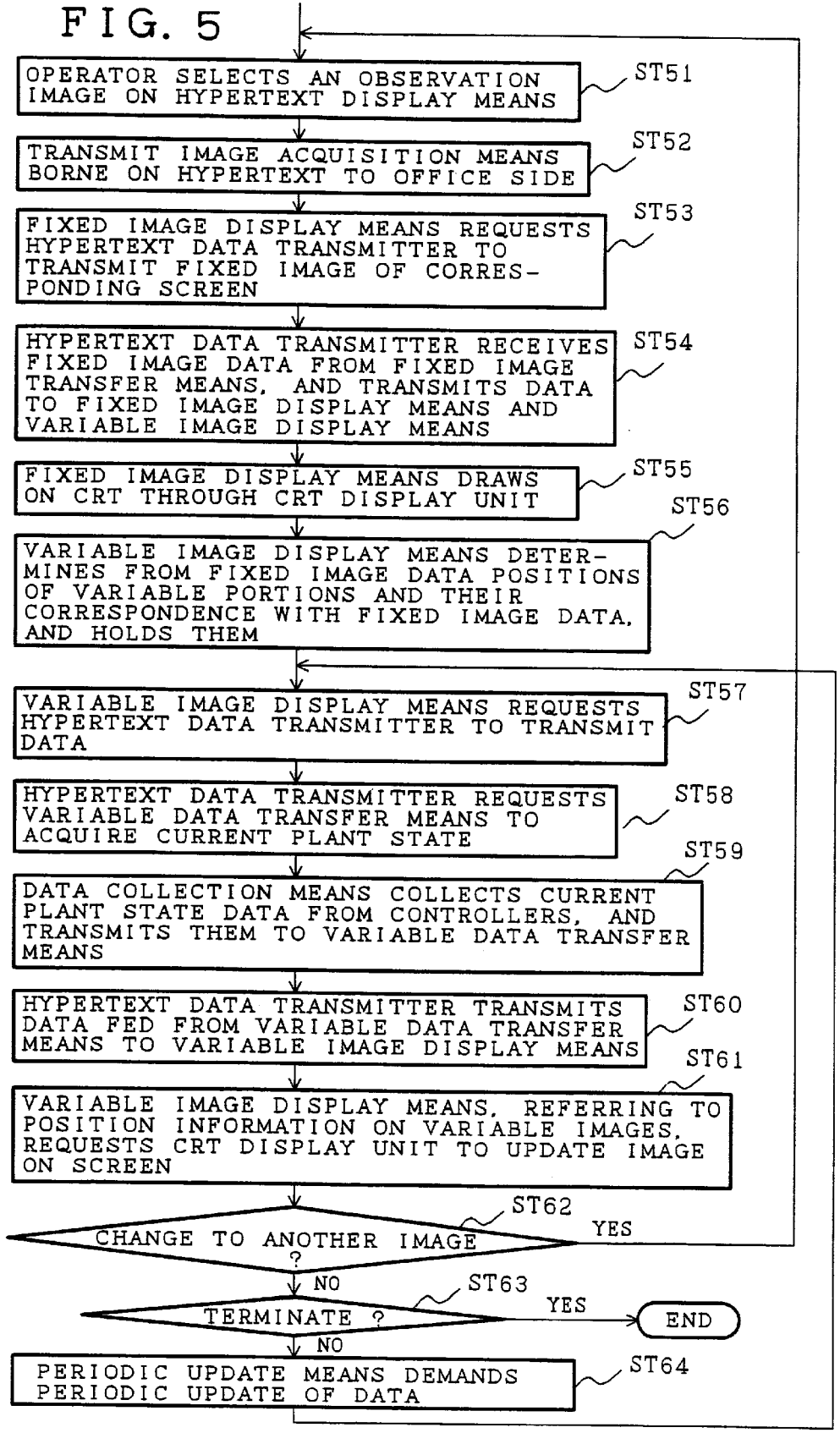
FIG. 5 is a flowchart illustrating the operation of the embodiment 2.
Figure 6:
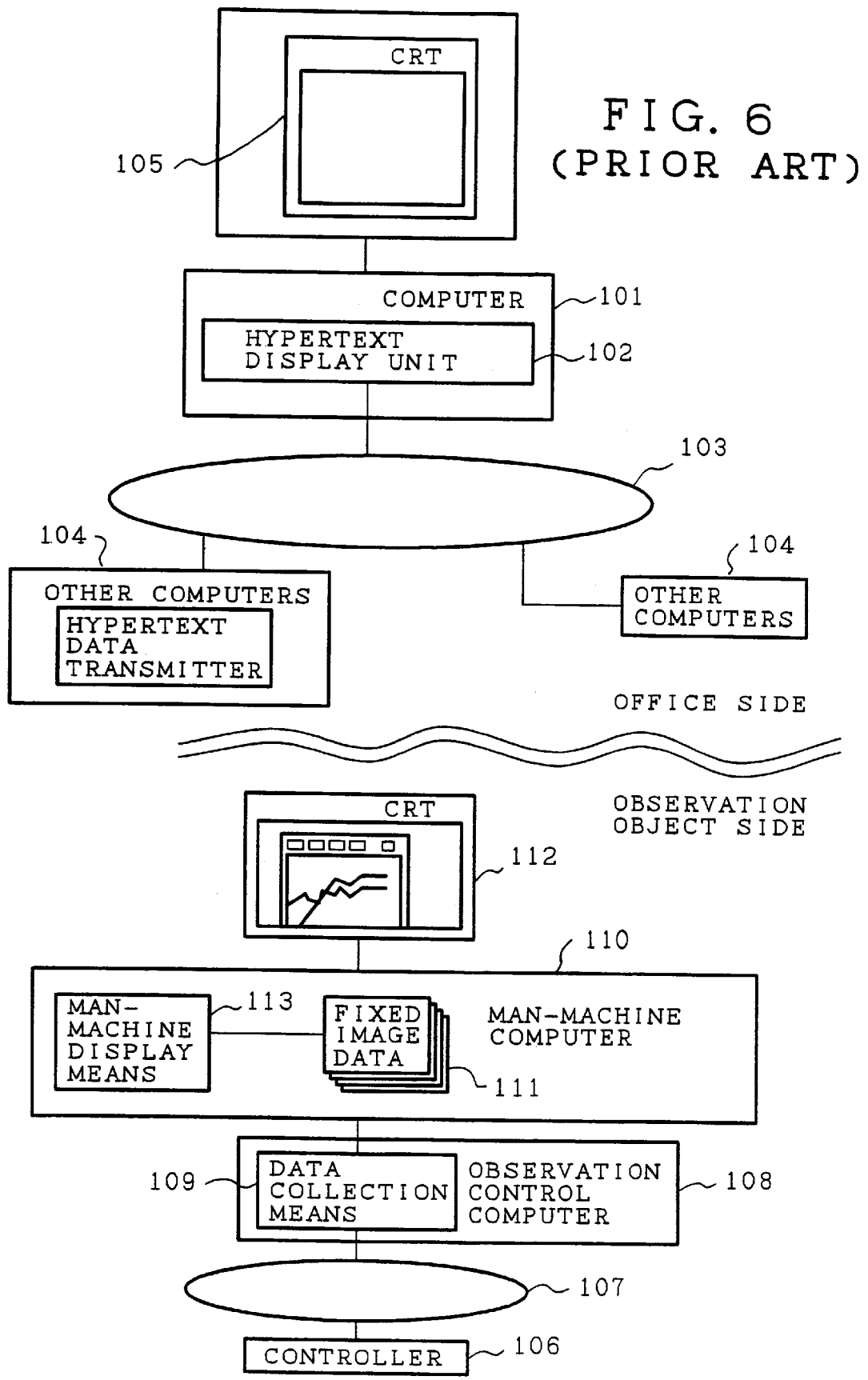
FIG. 6 is a block diagram showing a conventional remote observation system.

FIG. 5 is a flowchart illustrating the operation. When an operator selects the observation image on the hypertext display means 2 at step ST51, the hypertext data transmitter 41 transmits, on the hypertext, the corresponding program, that is, the corresponding image acquisition means 45 to the office side at step ST52. The office side stores in the program storage 25 the program of the image acquisition means 45 sent from the observation object side, and then carries out the display operation in accordance with the program. The display operation includes steps ST53–ST64, which are the same as steps ST2–ST13 in the flowchart of FIG. 3.

Thus, the present embodiment 2 carries out the display operation by transferring the image acquisition means, that is, the program corresponding to the selected observation image. This enables the office side to deal with changes in the display form at the observation object side because the program has been updated in accordance with the display form at the observation object side, thereby simplifying the configuration at the office side.

What is claimed is:

1. A remote observation system comprising:
   one or more controllers for collecting data by observing a plant at an observation side;
   a first data transmission line for transmitting data collected by said one or more controllers at said observation side;
   a data collection means for collecting data from said one or more controllers via said first data transmission line;
   a monitoring unit located at an office side which is remote from said observation side;
   a second data transmission line for connected between said observation side and said office side;
   a hypertext data transmission circuit for transmitting general-purpose hypertext data to said monitoring unit via said second data transmission line in response to a request for data transmission from said office side means, said hypertext data comprising a combination of fixed image data representing said plant and state data of various portions of said plant, which are obtained from said data collection means; and
   a hypertext display for displaying said hypertext data transmitted to said monitoring unit.

2. The remote observation system in accordance with claim 1, further comprising:
   variable data transfer means for transferring variable image data obtained from said data collection means to said hypertext data transmission circuit;
   fixed image transfer means for transferring said fixed image data from said data collection means to said hypertext data transmission means; and
   periodic update means for periodically requiring said observation object to transmit data;
   wherein said hypertext display means includes:
   variable image display means for displaying said variable image data transmitted from said hypertext data transmission means; and
   fixed image display means for displaying said fixed image data transmitted from said hypertext data transmission means.

3. The remote observation system in accordance with claim 1, further comprising:
   an image acquisition means, disposed at said observation side, for storing a program with a function of displaying a fixed image, a program with a function of displaying a variable image, and a program with a function of periodically transferring data from said observation object side to said office side, and
   a program storing means, disposed at said office side, for storing said programs transmitted from said observation side, and for displaying data transmitted from said observation side in accordance with said programs.

4. The remote observation system in accordance with claim 2, wherein said hypertext transmission means transmits said fixed image data first, and said state data every time said state data change, and said hypertext display means displays said state data in combination with said fixed image data.

5. The remote observation system in accordance with claim 3, wherein said hypertext transmission means transmits said fixed image data first, and said state data every time said state data change, and said hypertext display means displays said state data in combination with said fixed image data.

* * * * *